United States Patent [19]

Kopp

[11] Patent Number: 4,751,390

[45] Date of Patent: Jun. 14, 1988

[54] RADIATION DOSE-RATE METER USING AN ENERGY-SENSITIVE COUNTER

[75] Inventor: Manfred K. Kopp, Oak Ridge, Tenn.

[73] Assignee: The United States of America as represented by the United States Department of Energy, Washington, D.C.

[21] Appl. No.: 942,651

[22] Filed: Dec. 17, 1986

[51] Int. Cl.[4] .............................................. G01T 1/22
[52] U.S. Cl. .................................................... 250/370
[58] Field of Search ............... 250/370 R, 370 F, 374

[56] References Cited

U.S. PATENT DOCUMENTS

| | | | |
|---|---|---|---|
| 4,087,692 | 5/1978 | Lecuyer et al. | 250/370 F |
| 4,461,952 | 7/1984 | Allemand et al. | 250/370 F |
| 4,489,315 | 12/1984 | Falk et al. | 250/370 F |

*Primary Examiner*—Janice A. Howell
*Attorney, Agent, or Firm*—David E. Breeden; Stephen D. Hamel; Judson R. Hightower

[57] ABSTRACT

A radiation dose-rate meter is provided which uses an energy-sensitive detector and combines charge quantization and pulse-rate measurement to monitor radiation dose rates. The charge from each detected photon is quantized by level-sensitive comparators so that the resulting total output pulse rate is proportional to the dose-rate.

4 Claims, 3 Drawing Sheets

4,751,390

RADIATION DOSE-RATE METER USING AN ENERGY-SENSITIVE COUNTER

BACKGROUND OF THE INVENTION

This invention, which is a result of a contract with the U.S. Department of Energy, relates generally to ionizing radiation detection instrumentation and more specifically to ionizing radiation dose-rate meters.

In the art of ionizing radiation measurement, measurement of true radiation dose-rate at background levels of approximately 10 microroentgen/hour ($\mu$R/h) is a problem because (1) Geiger-Mueller pulse-counting instruments ignore the energy deposited by detected radiation events and therefore cannot directly measure dose-rate, and (2) ionization chambers or proportional counters used in the ionization current integrating mode generate insufficient current ($<10^{-12}$ amperes) for accurate measurements at background levels.

Conventional pulse counting methods thus result in inaccurate dose-rate measurements because the dose-rate in Roentgen/hour is proportional to the ionization produced per unit time by photons in a detector volume of air. A measurement of the charge deposited by each ionization event in addition to conventional pulse or event counting is required to obtain a true dose-rate determination in a pulse counting system. Thus, there is a need for a radiation dose-rate meter which has a detector that quantizes, in real time, the total charge deposited in the counter by each detected event.

SUMMARY OF THE INVENTION

In view of the above need, it is an object of this invention to provide an energy-compensated radiation dose-rate meter using an energy-sensitive detector which quantizes, in real time, the total charge deposited by each detected radiation event.

Other objects and many of the attendant advantages of the present invention will be apparent from the following detailed description of a preferred embodiment of the invention taken together with the drawings.

Briefly, the invention is a radiation dose-rate meter for measuring true ionizing radiation dose-rate from energy-sensitive, air-equivalent counters (proportional or solid state) by means of signal level discrimination of the signal from the detector in a multi-level discriminator circuit that quantizes, in real time, the total charge deposited in the counter by each detected event. Pulse counts are generated for each discriminator level crossing for the detected event so that the recorded count for each detected event is proportional to the true radiation dose-rate.

DETAILED DESCRIPTION OF THE PREFERRED EMBODIMENT

Figure 1:
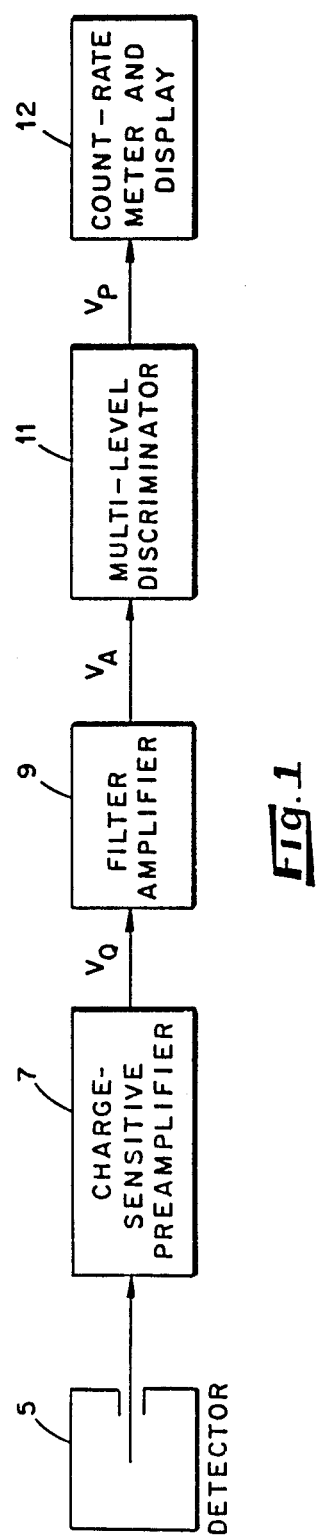
FIG. 1 is a schematic block diagram of a radiation dose-rate meter according to the present invention illustrating the conversion of detector output charge to dose-rate.

Referring now to FIG. 1, a practical dose-rate monitor according to the present invention is shown which employs an air-equivalent gamma detector in the form of a conventional gas filled proportional counter 5 configured to operate as in a conventional dose-rate monitor circuit. It will be understood that a semiconductor detector, such as a PIN diode, may also be used. The proportional counter 5 may take various forms. To test the present meter, a 2.3 cm diameter by 5 cm length aluminum chamber with 3 mm thick walls was used. The chamber was filled with a gas composed of 90 percent Ne and 10 percent $CF_4$ at 150 kPa pressure. The wall thickness was calculated for near air equivalent response to photons in the energy range of from 60 to 3000 KeV. A coaxial anode formed of 13-$\mu$m-diameter stainless steel wire was used in the detector. The chamber was operated with an electrode voltage of 1000 volts and at a gas multiplication factor of 200.

Figure 2:
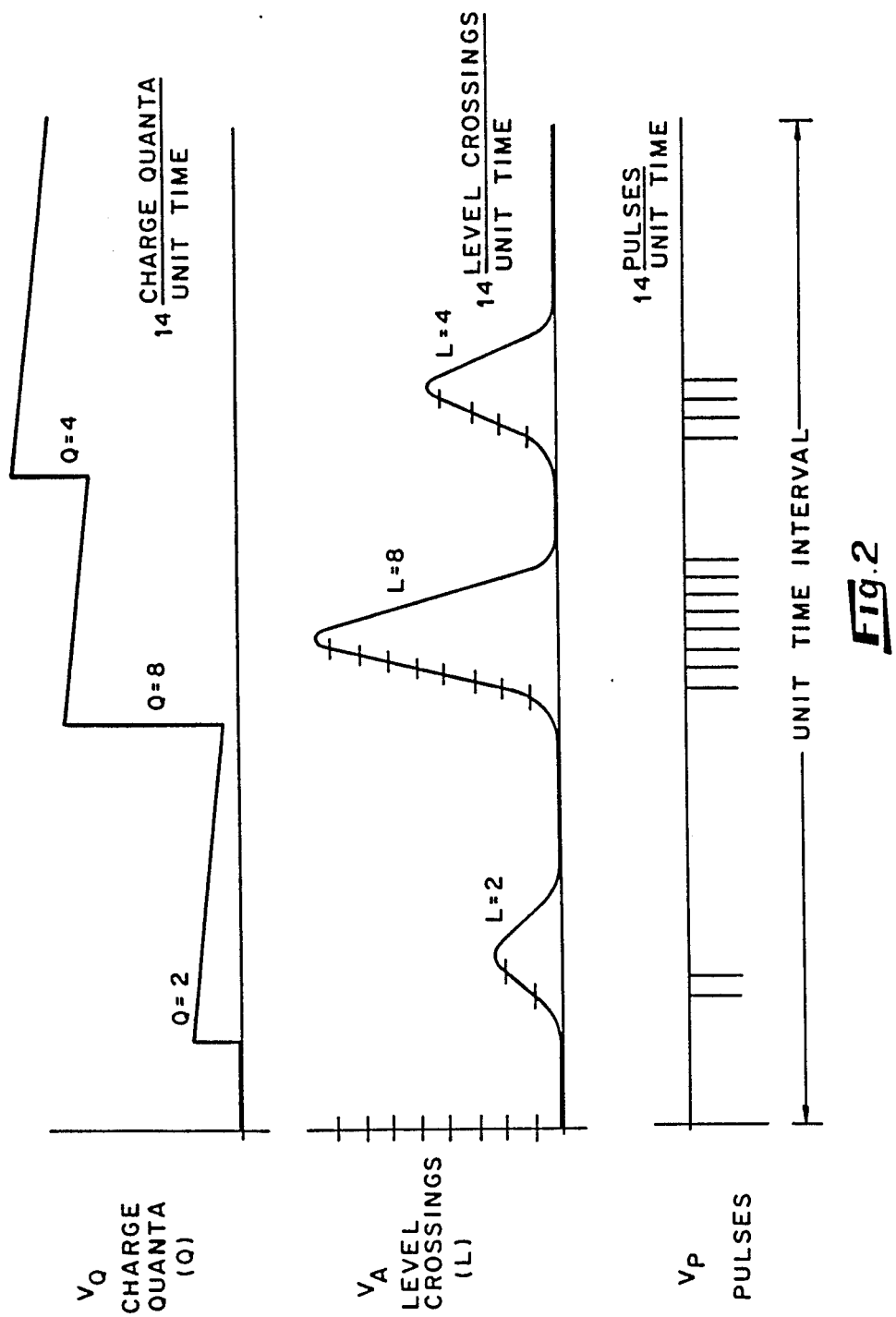
FIG. 2 is a graph illustrating the proportional conversion of 14 charge quanta from the detector of FIG. 1 to 14 count pulses over a unit time interval.

The output of the detector is connected to the input of a standard low-noise, wideband charge-sensitive preamplifer 7 having a charge gain of 1V/pC (picocoulomb) which converts the low level input current pulse produced by the charge collected during the detection of an ionizing event within the detector 5 to a step voltage signal ($V_Q$) proportional to the input current. This voltage signal is then applied to the input of a filter amplifier 9 operating at a gain of 400 and a filter time constant of 0.25 $\mu$ sec., which generates a fixed width, unipolar voltage pulse ($V_A$) having an amplitude proportional to the step change in the voltage signal $V_Q$ from the preamplifier 7, as shown in FIG. 2. Thus, the amplitude of the output pulses from the filter amplifier 9 are proportional to the charge deposited in the detector by each radiation event. The filter amplifier 9 time constant is selected so that the output returns to zero very quickly, ($\sim 2\mu$ sec.) in order to minimize coincidence loss due to pulse pile-up.

The output of the filter amplifier 9 is applied to the input of a multi-level discriminator 11 which is composed of a plurality of stacked comparators, each connected through a one-shot and a NOR-gate (FIG. 3) to quantize the amplifier output pulses. Each positive level crossing of the stacked comparators, which have a separate reference voltage that increases in selected increments according to the stacked order, represents one quantum of dector charge. Therefore, the sum of all level crossings (i.e., the sum of all charge quanta per unit time), represented by the number of pulses at the output of the multi-level discriminator, is proportional to the true dose-rate, as will be explained more fully hereinbelow.

The pulses representing the true count rate at the output of the descriminator 11 are applied to the input of a conventional count-rate meter 12 which includes a display indicating the true detected dose-rate based on the counts/unit time.

Figure 3:
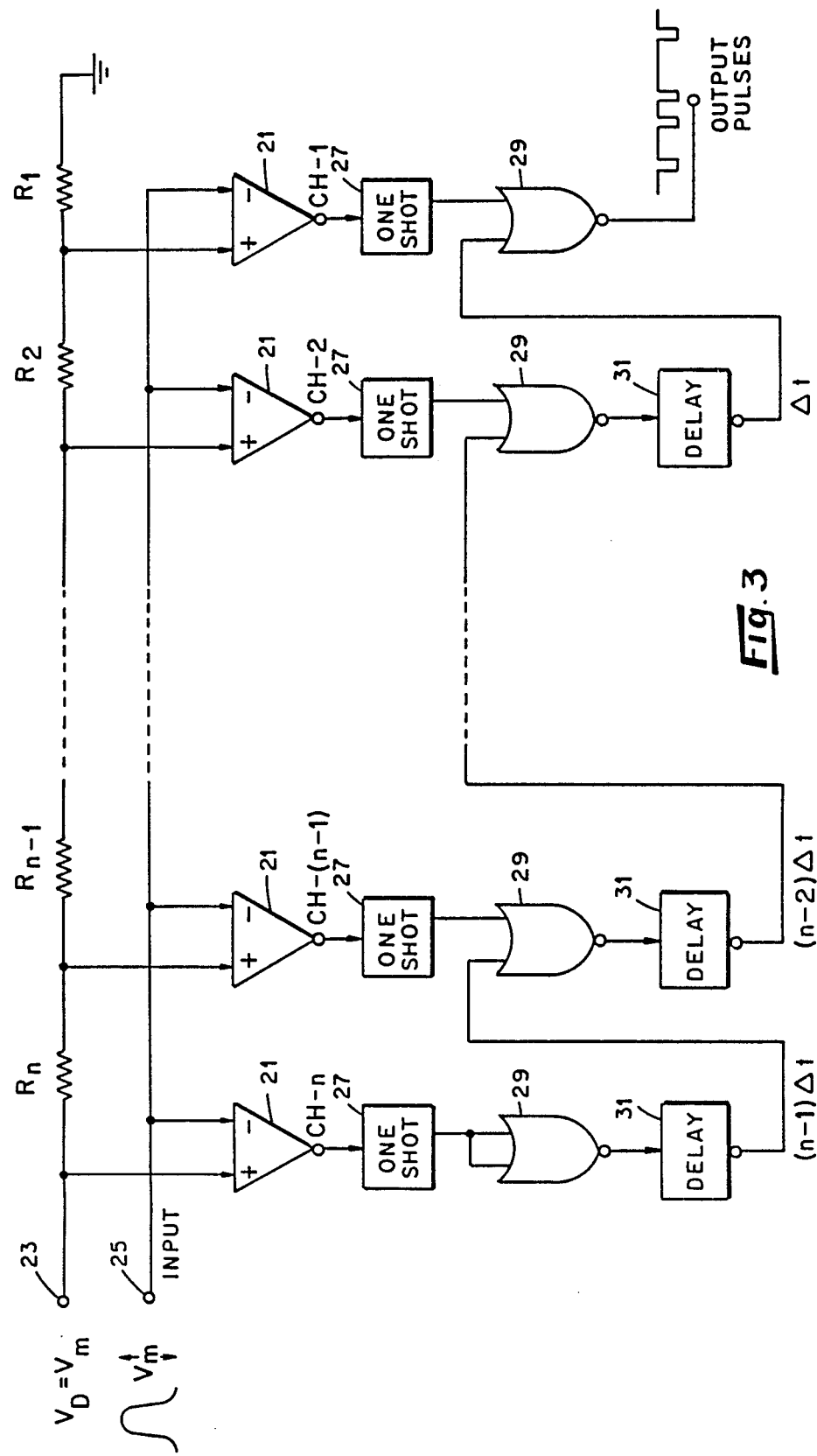
FIG. 3 is a logic diagram of the multi-level discriminator shown in FIG. 1 illustrating n level conversions of an input pulse amplitude to an output pulse train.

Referring now to FIG. 3, it will be seen that the multi-level discriminator 11 (FIG. 1) consists of a plurality of stacked discriminator channels (CH-1 through CH-n). The actual number of channels will depend on the energy resolution required. In the example illustrated in FIG. 2, n=8, indicating eight stacked discriminator channels which is sufficient for linear response over a counting range of between background radiation levels (10 $\mu$R/h) and 10 R/h for gamma photon counting. Thus, each discriminator channel includes a separate discriminator, or comparater, 21 having a non-inverting reference input (+) for receiving a reference voltage and an inverting input (−) connected to receive the output voltage pulse from the filter amplifer 9 (FIG. 1) which is the input to the multi-level discriminator. The reference voltage for each comparator channel is provided by applying a dc reference voltage ($V_d$) from a dc source (not shown) to a plurality (n) of resistors ($R_1$ through $R_n$) connected in series between the $V_d$ source input terminal 23 and ground potential to provide n voltage divisions. The reference input (+) of the comparator of each channel is connected to the voltage divider as shown in FIG. 3 to provide the stacked comparison of the input signal applied to the input terminal 25. Thus, the reference voltage developed across $R_1$ is applied to the CH-1 comparator, the voltage across $R_1$ plus $R_2$ is applied to the CH-2 comparator, etc. In this stacked order, a large amplitude pulse, such as the second pulse shown in FIG. 2, which exceeds $V_m$ will activate each discriminator channel (CH-1 through CH-n) producing, in this case, eight discriminator level crossings and eight counts. A smaller pulse, such as the first pulse shown in FIG. 2, only exceeds two discriminator channel levels, CH-1 and CH-2, providing two level crossings and produces only two counts.

Each comparator 21 responds, producing a level crossing for its respective channel, by switching the logic level of its output from a high to a low level when the voltage of the input signal exceeds the reference voltage applied to the non-inverting input (+). The output of each comparator 21 is connected through corresponding channel one-shots 27 to one input of a corresponding channel NOR-gate 29 which converts the level crossings to an output pulse. Each one-shot 27 is identically timed to produce a short duration (10 ns) positive going pulse which activates the corresponding channel NOR-gate 29 producing a negative going 10 ns output pulse. Parallel-to-serial conversion of the pularity of comparator channel outputs is performed by summing and additive delaying output pulses from each higher order channel to generate a train of pulses. The number of pulses being proportional to the input pulse amplitude at input terminal 25. The delay circuits assure that these pulses are adequately spaced (>10 ns) even for an input pulse from the filter amplifier 9 approaching zero rise time (saturation pulse).

To provide the parallel-to-serial conversion and the necessary delay between pulses from each comparator channel, the output of each channel NOR-gate 29, with exception of the first channel (CH-1) NOR-gate, is connected through a delay circuit 31 to a second input of the next lower order channel NOR-gate 29, as shown in FIG. 3. Each delay circuit 31 is identical and provides a fixed delay $\Delta t = 20$ n sec. A positive going output pulse, delayed $\Delta t$, is generated for each negative going pulse from the corresponding NOR-gate 29 connected to the input thereof. This provides an output count pulse train of 10 ns negative going pulses from the first channel (CH-1) NOR-gate 29 spaced 20 n sec. apart. The number of pulses in the output pulse train corresponds to the number of comparator channel level crossings (i.e., the sum of all charge quanta per event) which is proportional to the true dose-rate for an air-equivalent detector.

Referring now to FIG. 2, the operation of the above described circuit is illustrated for the real time conversions of detector charge quanta of 14 charge quanta per a unit time interval to 14 count pulses per the same unit time. A current pulse from the energy-sensitive dector 5 (FIG. 1) is converted to a step voltage signal $V_Q$ by the charge sensitive preamplifier 7. The resulting voltage steps of three ionizing events within the detector depositing charge quanta of $Q=2$, $Q=8$, and $Q=4$, respectively, is shown in the top graph of FIG. 2. These voltage steps are amplified and filtered by the filter amplifier 9 to produce fixed width, unipolar voltage pulses of 2 $\mu$s. duration following each step increase of the voltage signal $V_Q$. These pulses are applied to the multi-level discriminator 11 which in turn detects the number of stacked comparator level crossings L for each pulse as indicated on the $V_A$ pulse curves. In this example a total of 14 charge quanta per unit time results in 14 level crossings and, consequently, 14 countable pulses ($V_p$) per unit time which are registered by the count-rate meter 12 as a true energy-sensitive radiation dose-rate count.

The response of the energy sensitive dose-rate meter described above was tested in radiation fields of 0.4, 4, 40, and 400 R/h with 662-keV photons from a $^{137}$Cs calibration source. The meter provided a linear response from 10 $\mu$R/h to 10 R/h, corresponding to a count rate of 0.4 to $4 \times 10^5$ counts/sec. The response of this meter to 59 keV photons from a 241Am source in a field of $2 \pm 0.5$ R/h fell very close to the $^{137}$Cs source response. Further, a plot of the response curve (not shown) shows a positive non-linear slope above 10 R/h up to the maximum test field intensity of 400 R/h.

Thus, it will be seen than a radiation dose-rate meter has been provided which uses an energy-sensitive counter and quantizes, in real time, the total charge deposited by each detected radiation event to provide a true dose-rate measurement. It will be obvious to those skilled in the art that various modifications and changes may be made to the illustrated embodiment without departing from the spirit and scope of the invention as set forth in the following claims appended hereto and forming a part of this specification. For example, the biasing of the stacked discriminator levels need not be in uniformly increasing increments. Although constant reference level increments (i.e., $R_1$-$R_n$ all of equal value) makes the count rate exactly proportional to the dose-rate for an exactly air-equivalent dector, uneven increasing increments would make it possible to calibrate a non-air-equivalent detector to provide an air-equivalent dose-rate response.

I claim:

1. A radiation dose-rate meter, comprising:
    an energy-sensitive radiation detecting element which generates at an output thereof ionization current pulses having an amplitude proportional to the charge quanta deposited in said radiation detecting element by detected photons of ionizing radiation;
    a charge-sensitive preamplifier connected to the output of said radiation detecting element which generates at an output thereof voltage step pulses in response to said current pulses from said radiation detecting element, each voltage step pulse having an amplitude proportional to the charge quanta deposited in said detecting element by a photon of detected radiation;
    a filter amplifier having a selected filter time constant for generating fixed width pulses at an output thereof in response to each of said step voltage pulses from said preamplifier having an amplitude proportional to the amplitude of each of said step voltage pulses applied to an input thereof;

a multi-level discriminator means responsive to said voltage pulses at the output of said filter amplifier for generating a train of count pulses at an output thereof in response to each of said fixed width pulses; and a count rate meter means connected to the output of said multi-level discriminator means of registering said count pulses of each of said train of count pulses as a quantized measure of the radiation dose-rate per unit time of said detected photons of ionizing radiation.

2. The meter as set forth in claim 1 wherein said multi-level discriminator means includes a plurality n of parallel stacked discriminator channels each having a signal input connected to receive said fixed width pulses and a selected threshold reference voltage level corresponding to selected intervals of charge quanta to be quantized by said multi-level discriminator so that a trigger pulse is generated at the output of each of said plurality of parallel stacked discriminator channels in which the amplitude of said fixed width pulses from said filter amplifier exceeds its reference voltage level and a parallel-to-serial pulse train converter means for converting trigger pulses generated at the outputs of said plurality of parallel stacked discriminator channels to a train of serial pulses corresponding in number to the detected charge quanta.

3. The meter as set forth in claim 2 wherein said parallel-to-serial pulse train converter means includes a plurality n of identical one-shots corresponding to said plurality n of discriminator channels each connected to corresponding outputs of said plurality of discriminator channels and responsive to said trigger pulses for generating fixed width output pulses, a plurality n of pulse gating circuits each having an input connected to the output of the corresponding one of said plurality of one-shots, a first one of said plurality of pulse gating circuits having an output connected to said count-rate meter means, and a plurality (n−1) of identical pulse delay circuits connected between outputs of each of said plurality of pulse gating circuits excluding said first one of said plurality of pulse gating circuits and a further input of the next succeeding one of said plurality of pulse gating circuits so that said trigger pulses generated by said fixed width output pulses of said plurality of one-shots are successively gated through said plurality of pulse gating circuits to form said output pulse train at the output of said first one of said plurality pulse gating circuits.

4. The meter as set forth in claim 3 wherein said detecting element is a gas filled proportional counter.

* * * * *